United States Patent
Willhoit

(10) Patent No.: US 9,940,396 B1
(45) Date of Patent: Apr. 10, 2018

(54) MINING POTENTIAL USER ACTIONS FROM A WEB PAGE

(71) Applicant: Amazon Technologies, Inc., Seattle, WA (US)

(72) Inventor: Donald Ryan Willhoit, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 476 days.

(21) Appl. No.: 14/565,888

(22) Filed: Dec. 10, 2014

(51) Int. Cl.
| | |
|---|---|
| *G06F 17/22* | (2006.01) |
| *G06F 17/30* | (2006.01) |
| *G06F 3/16* | (2006.01) |
| *H04L 29/08* | (2006.01) |

(52) U.S. Cl.
CPC ........ *G06F 17/30867* (2013.01); *G06F 3/167* (2013.01); *G06F 17/2247* (2013.01); *G06F 17/30905* (2013.01); *H04L 67/10* (2013.01)

(58) Field of Classification Search
CPC ......... G06F 17/30905; G06F 17/30867; G06F 17/2247; G06F 3/167; H04L 67/10
See application file for complete search history.

(56) References Cited

U.S. PATENT DOCUMENTS

| | | | | |
|---|---|---|---|---|
| 7,283,973 | B1 * | 10/2007 | Loghmani | G06Q 30/00 379/67.1 |
| 8,286,076 | B1 * | 10/2012 | Szewczyk | G06F 9/4443 715/241 |
| 8,311,900 | B1 * | 11/2012 | Bates | G06Q 30/0601 705/27.1 |
| 8,341,529 | B1 * | 12/2012 | Li | G06F 17/30861 715/741 |
| 2006/0026206 | A1 * | 2/2006 | Loghmani | G06Q 30/06 |
| 2007/0083366 | A1 * | 4/2007 | Peters | G10L 15/26 704/235 |
| 2008/0228494 | A1 * | 9/2008 | Cross | G10L 15/22 704/275 |

(Continued)

OTHER PUBLICATIONS

"Opera Help: Using Opera With Voice," downloaded from http://help.opera.com/Windows/9.20/en/voice.html on Oct. 7, 2014, 4 pages.

(Continued)

*Primary Examiner* — Maikhanh Nguyen
(74) *Attorney, Agent, or Firm* — Klarquist Sparkman LLP

(57) ABSTRACT

Techniques and solutions are described for detecting potential user actions from a web page. Web page resources may be received for a requested web page, and a document object model (DOM) may be maintained using from the resources. One or more interactive DOM elements may be identified using the created DOM, and the interactive DOM elements may be ranked in an order according to one or more heuristics. In response to receiving a voice command from a user of a client computing device in connection with the web page, a text string may be generated using voice-to-text recognition. The text string may be representative of the received voice command. A list of potential user actions that match the text string may be generated. The matching may be based on a comparison of the text string with at least another text string associated with the ranked interactive DOM elements.

20 Claims, 8 Drawing Sheets

(56) References Cited

U.S. PATENT DOCUMENTS

| | | | |
|---|---|---|---|
| 2009/0150262 A1* | 6/2009 | Mizhen | G06Q 20/12 705/26.1 |
| 2010/0287028 A1* | 11/2010 | Hauser | G06Q 30/0201 705/7.29 |
| 2014/0067367 A1* | 3/2014 | Simmons | G09B 17/003 704/8 |
| 2014/0201229 A1* | 7/2014 | Kirazci | G06F 17/30643 707/767 |

OTHER PUBLICATIONS

"XHTML+Voice—Wikipedia, the free encyclopedia," downloaded from http://en.wikipedia.org/wiki/XHTML%2BVoice on Oct. 7, 2014, 3 pages.

* cited by examiner

MINING POTENTIAL USER ACTIONS FROM A WEB PAGE

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

The following description is directed to techniques and solutions for detecting potential user actions from a web page. Web pages are displayed by a client computing device according to web content and associated resources received for the web page. In some situations, metadata (or other text data) associated with web page resources (e.g., document object model (DOM) elements and attributes of the DOM elements) may be harvested and used to build a corpus of phrases, such as likely voice statements, made by a user interacting with the web page. For example, the metadata "Add to Shopping Cart" attached to an interactive button in a web page is used by the web browser as a tooltip or as spoken text; however, "Add to Shopping Cart" would also be the likely command (e.g., voice or written command) that the user will provide to add an item to their shopping cart. In this regard, DOM elements (e.g., interactive DOM elements) may be detected for a requested web page. Each DOM element may include one or more attributes, which may be associated with metadata, such as text labels or phrases. The metadata may be acquired and ranked based on, for example, heuristics or other ranking criteria, and the ranked metadata for a plurality of DOM elements and attributes of a requested web page may be stored as a corpus of phrases which is representative of likely voice statements or commands of a user in connection with the web page. After a user enters a voice (or written) command, the command may be converted to a text string that is representative of the command. The text string may then be compared (e.g., using text matching or natural language processing) with the corpus of phrases, and a list of potential user actions (e.g., from the corpus) that match the text string may be displayed (or a top-listed action may be automatically performed).

Figure 1:
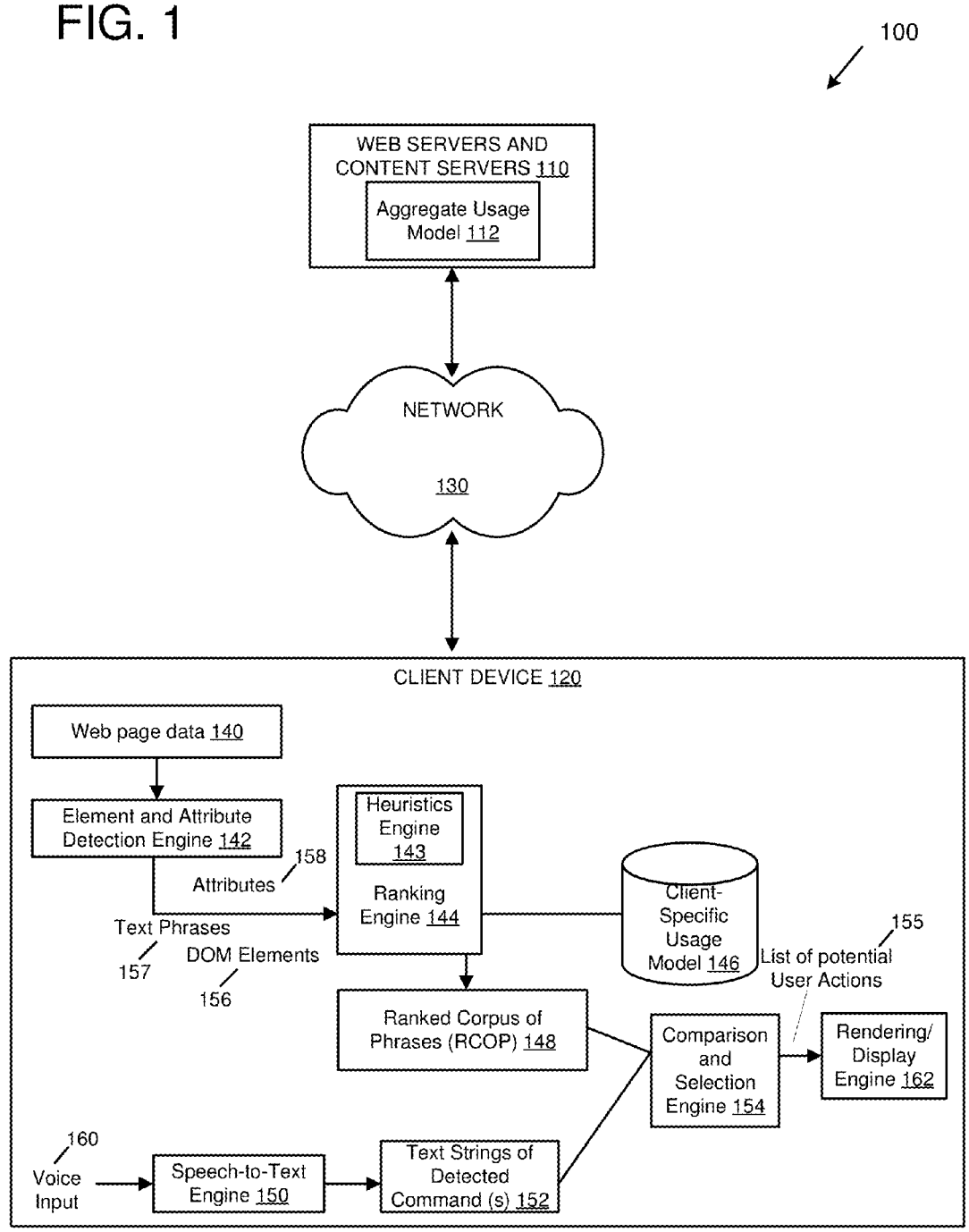
FIG. 1 is a block diagram depicting an example environment for detecting potential user actions from a web page, in accordance with an example embodiment of the disclosure.

FIG. 1 is a block diagram depicting an example environment 100 for detecting potential user actions from a web page, in accordance with an example embodiment of the disclosure. Referring to FIG. 1, the example environment 100 includes web servers and content servers 110 that provide web pages and associated resources to devices performing web browsing operations (e.g., to client device 120). For example, the web servers and content servers 110 can provide web resources such as HTML, JavaScript, images, video content, and/or other web content in response to a web page request from a client device (e.g., a client device running a web browser application).

The example environment 100 includes client device 120. For example, the client device 120 (e.g., a laptop, desktop, notebook, phone, tablet, or other type of computing device) can run a web browser application (not depicted) for loading web pages obtained, via the network 130 (e.g., the Internet), from the web servers and content servers 110. The client device 120 may further comprise a detection engine 142, a ranking engine 144, a heuristics engine 143, a comparison and selection engine 154, speech-to-text engine 150 and rendering/display engine 162, which engines may be used in connection with detecting potential user actions from a web page.

The detection engine 142 may comprise suitable logic, circuitry, interfaces, and/or code and may be operable to detect one or more DOM elements (e.g., 156) in connection with a requested web page. Example DOM elements may include various interactive DOM elements, such as action buttons, image maps, text fields, combo boxes, hyper-links, as well as other types of DOM elements. The detection engine 142 may be further operable to examine various attributes (e.g., 158) for each of the DOM elements and detect metadata (e.g., text phrases) (157), which are associated with the attributes. For example, the text phrases may be associated with a value attribute, a title attribute, a tooltip attribute or a long description attribute of a DOM element. For example, an "Add to Cart" button may have a tooltip attribute that includes the metadata (or text phrase) "add to cart". The detection engine may communicate one or more of the detected DOM elements 156, text phrases 157, and/or attributes 158 to the ranking engine 144.

The ranking engine 144 may comprise suitable logic, circuitry, interfaces, and/or code and may be operable to perform ranking on data received from the detection engine 142, based on one or more ranking criteria. In some instances, the ranking engine may implement the heuristics engine 143, which may use one or more heuristics for purposes of ranking information (e.g., one or more of the received DOM elements 156). Example heuristics may include a semantic meaning of a DOM element, a structure of a DOM element, space taken by a visual representation of a DOM elements (e.g., how big is a given DOM element, such as a button, when displayed on the screen of the client device 120), currently displayed status for the DOM elements (i.e., whether a DOM element is in the current viewport for the web page and is being currently displayed), and interaction status for the DOM element (i.e., whether a DOM element is an interactive DOM element, such as an action button).

The example heuristics may further include aggregate usage statistics associated with usage of the DOM element by a plurality of other users or the current user (e.g., how popular a given DOM element is among other users and/or the current user). In this regard, the heuristics engine may use the client-specific usage model 146, which may include usage statistics (e.g., how often a given DOM element has been previously used (or interacted with)) associated with a user of the client device 120. Similarly, the aggregate usage model 112 may store usage statistics (e.g., associated with DOM elements of a currently displayed web page at device 120), but associated with other users (e.g., other users who have requested the same web page). Information from the aggregate usage model 112 may be requested by (and communicated to) the client device 120 for purposes of performing ranking operations by the ranking engine 144 and/or the heuristics engine 143. Even though the aggregate usage model database 112 is illustrated as part of the web servers and content servers 110, the database 112 (or a copy of database 112) may be maintained at the client device 120, or data associated with the aggregate database 112 may be periodically communicated to (e.g., on demand or at a periodic time interval) from the servers 110 to the client device 120.

In some implementations, the ranking engine 144 may rank the DOM elements 156 and/or the attributes 158 using the heuristics engine 143 and/or another ranking criteria (e.g., based on a user-defined ranking criteria, or a popularity criteria based on usage statistics from databases 112 and/or 146). In instances when the DOM elements 156 (and/or the corresponding attributes 158 for one or more of the DOM elements) are ranked by the engine 144, a ranked corpus of phrases (e.g., 148) may also be generated using the text phrases 157, but in a ranked order corresponding to the ranked DOM elements 156 and/or ranked attributes 158. The text phrases within the corpus 148 may be representative of one or more potential user actions that a user may take in connection with a DOM element (e.g., "Add to Cart" text phrase acquired from a tooltip attribute of a button DOM element, is indicative of a user action of adding an item to an electronic shopping cart).

The ranked corpus of phrases 148 may be generated by the detection engine 142, and a new (ranked) version may be stored after the ranking engine 144 and/or the heuristics engine 143 rank the DOM elements 156 and/or attributes 158. However, in other implementations, the ranked corpus of phrases may be generated (e.g., based on the text phrases 157) by the ranking engine 144 (or the heuristics engine 143) after the DOM elements 156 and/or the attributes 158 have been ranked.

The ranked corpus of phrases 148 may be stored as a historic database so that new text phrases are added when a new web page is requested and displayed by the client device 120, or a new ranked corpus of phrases 148 may be generated each time a new web page is requested by the client device 120. Additionally, in some implementations, the ranked corpus of phrases may be updated (and re-ranked) after the user changes the viewport of the currently displayed web page. For example, after a user scrolls down a web page, the web page (and DOM elements) within the viewport change. This change in the viewport may result in change of the heuristics and the text phrases for the currently displayed page within the viewport may be given priority, resulting in re-arranging (or re-ranking) of the ranked corpus of phrases 148. In this regard, a dynamic update of the corpus of phrases 148 may take place, each time a user changes the page viewport.

The comparison and selection engine 154 may comprise suitable logic, circuitry, interfaces, and/or code and may be operable to compare between text phrases associated with detected one or more commands (e.g., 152) and the text phrases within the corpus of phrases 148. The one or more commands detected by the speech-to-text engine 150 may be a ranked list of commands based on voice detection processing. The comparison and selection engine 154 may then select one or more text phrases from the corpus 148 based on the matching, and generate a list 155 of potential user actions. The comparison and selection engine 154 may perform matching based on similarity and/or based on natural language processing. Prior to natural language processing, one or more stop words may be discarded from the text strings (or phrases) 152 and 148. Natural language processing techniques may then be applied, such as part-of-speech recognition and tagging, stemming, providing of synonyms, parsing, question answering, morphological segmentation, automatic summarization, and so forth.

The rendering/display engine 154 may comprise suitable logic, circuitry, interfaces, and/or code and may be operable to render and display the generated list 155 of potential user actions. In an example embodiment, the list of potential user actions 155 may not be displayed. Instead, a top-listed potential user action may be selected from the list 155 and may be automatically performed by the client device 120.

The speech-to-text engine 150 may comprise suitable logic, circuitry, interfaces, and/or code and may be operable to detect (or receive) voice input 160, and convert the voice input into one or more texts strings 152 of detected commands.

In some implementations, one or more of the processing functions discussed above (and illustrated in FIG. 1 as being performed by client device 120) may be offloaded to and performed entirely (or partially) by the web servers and content servers 110. For example, computation/processing-intensive tasks as the voice detection of input 160 and/or the speech-to-text processing of engine 150, may be performed outside of the client device 120 (e.g., by the servers 110 or by another dedicated server communicatively coupled to client device 120). In this case, the text strings/phrases 152 for detected commands may be received by the client device 120 from the servers 110 via the network 130.

In operation, the client device 120 may request a web page from the web servers and content servers 110 and receives web page resources for the requested web page, such as web page data 140. For example, a user of the client device 120 can enter a URL for the web page into a web browser application running at the client device 120 to initiate the web page request. In response, the client device 120 can receive web page resources (e.g., 140) for the requested web page, which can comprise HTML, JavaScript, Cascading Style Sheet (CSS) information, images, and/or other web content.

Once the client device 120 has received the web page resources for the requested web page (as depicted at 122), the client device 120 loads the requested web page. For example, the client device can load the HTML and associated resources into a web browser application. The client device 120 can also perform various processing operations using the HTML and associated resources for purposes of detecting potential user actions. For example, the detection engine 142 within the client device 120 can create a DOM (i.e., a DOM tree structure), create processed layers (e.g., composited layers), etc. In the alternative, the DOM tree structure may be received as part of the web page data 140. The DOM tree structure may include specific DOM elements 156, a count of various types of DOM elements, attributes 158 of the DOM elements, ordering of the DOM elements in the tree structure and so forth.

The ranking engine 144 and/or the heuristics engine 143 may rank the text phrases 157, which are indicative of potential user actions in connections with the requested web page. The ranked text phrases 157 are used to generate the ranked corpus of phrases 148. After the client device 120 detects voice input 160, the speech-to-text engine 150 may be used to convert the voice input 160 into one or more text strings 152, indicative of user commands within the voice input 160. The comparison and selection engine 154 may compare (or use natural language processing) the text strings/phrases 152 generated by the speech-to-text engine 150 with the ranked corpus of phrases 148, to generate the list 155 of potential user actions. The rendering/display engine 162 may then render the list 155 on a display of the client device 120.

Figure 2:
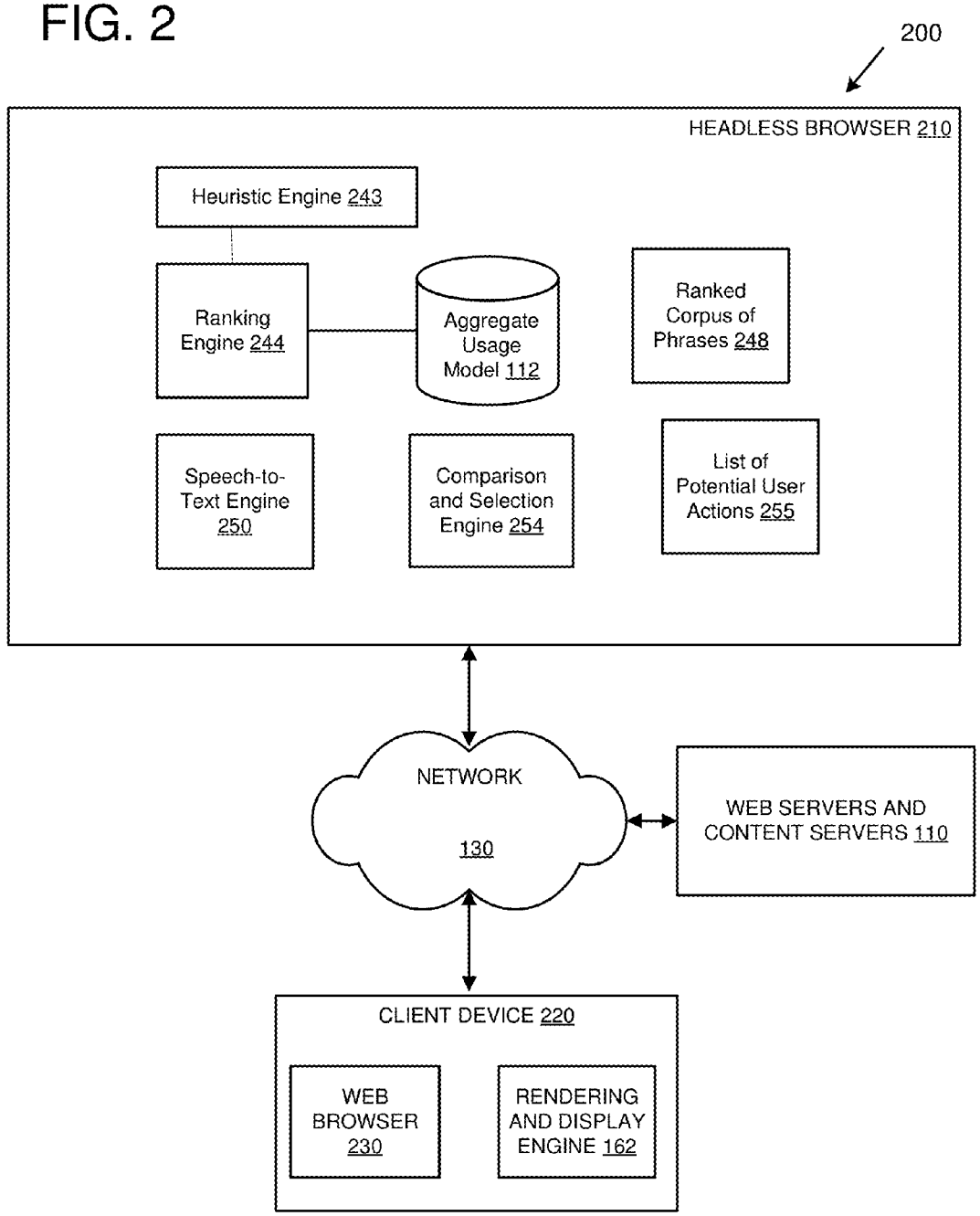
FIG. 2 is a block diagram depicting another example environment for detecting potential user actions from a web page, in accordance with an example embodiment of the disclosure.

FIG. 2 is a block diagram depicting another example environment 200 for detecting potential user actions from a web page, in accordance with an example embodiment of the disclosure. Referring to FIG. 2, the example environment 200 includes a headless browser environment 210. The headless browser environment 210 can comprise various types of computing devices (e.g., server computers, databases, networking devices, etc.) that provide the headless browser environment (e.g., as a centralized service or as a distributed, or cloud-based, service). The headless browser environment 210 supports web browsing activity of client devices, such as client device 220 connected via network 130. For example, the headless browser environment 210 can receive a request for a web page from the client device 220 (e.g., via a web browser application 230 running on the client device 220). In response, the headless browser environment 210 can retrieve web page resources (e.g., HTML, JavaScript, CSS information, images, and/or other web page resources) from web servers and content servers 110. The headless browser environment 210 can provide the web page resources to the client device 220 in their original state (e.g., original HTML and related resources) and/or in a processed state. For example, the headless browser environment 210 can process the web page resources (e.g., create a DOM, detect one or more attributes for a plurality of DOM elements, create processed layers, or create bitmap images) and send the processed resources to the client device 220. The client device 220 can received the web page resources, perform local processing if needed, and display the web page within the web browser application 230.

In some implementations, the headless browser environment 210 receives a request for a web page from the client device 220 and obtains web page resources (e.g., HTML and related resources) for the web page from the web servers and content providers 110 and/or from local storage (e.g., local cache). Additionally, the headless browser environment 210 can perform some of the operations performed by the client device 120 in reference to FIG. 1.

More specifically, the headless browser 210 may comprise a ranking engine 244, a heuristics engine 243, a speech-to-text engine 250, and a comparison/selection engine 254. Functionalities of such engines may be substantially similar to the functionalities of the corresponding engines (e.g., ranking engine 144, heuristics engine 143, speech-to-text engine 150, and comparison/selection engine 154) illustrated and discussed above in reference to FIG. 1.

In an example operation for mining potential user actions from a web page, the headless browser environment 210 may receive a request for a web page from the client device 220. The headless browser environment 210 may obtain the web page resources from the web servers and content servers 110, and may perform all subsequent functions (as described in reference to FIG. 1) for generating a ranked corpus of phrases 248. After a voice input is detected at client device 220, such voice input may be communicated to the headless browser environment 210 for processing by the speech-to-text engine 250. The detected text strings/phrases from the voice input may be compared with the ranked corpus of phrases to generate the list 255 of potential user actions. The generated list 255 may be returned back to the client device 220. The rendering engine 162 may then render the received list 255 on a display of the client device 220.

Figure 3:
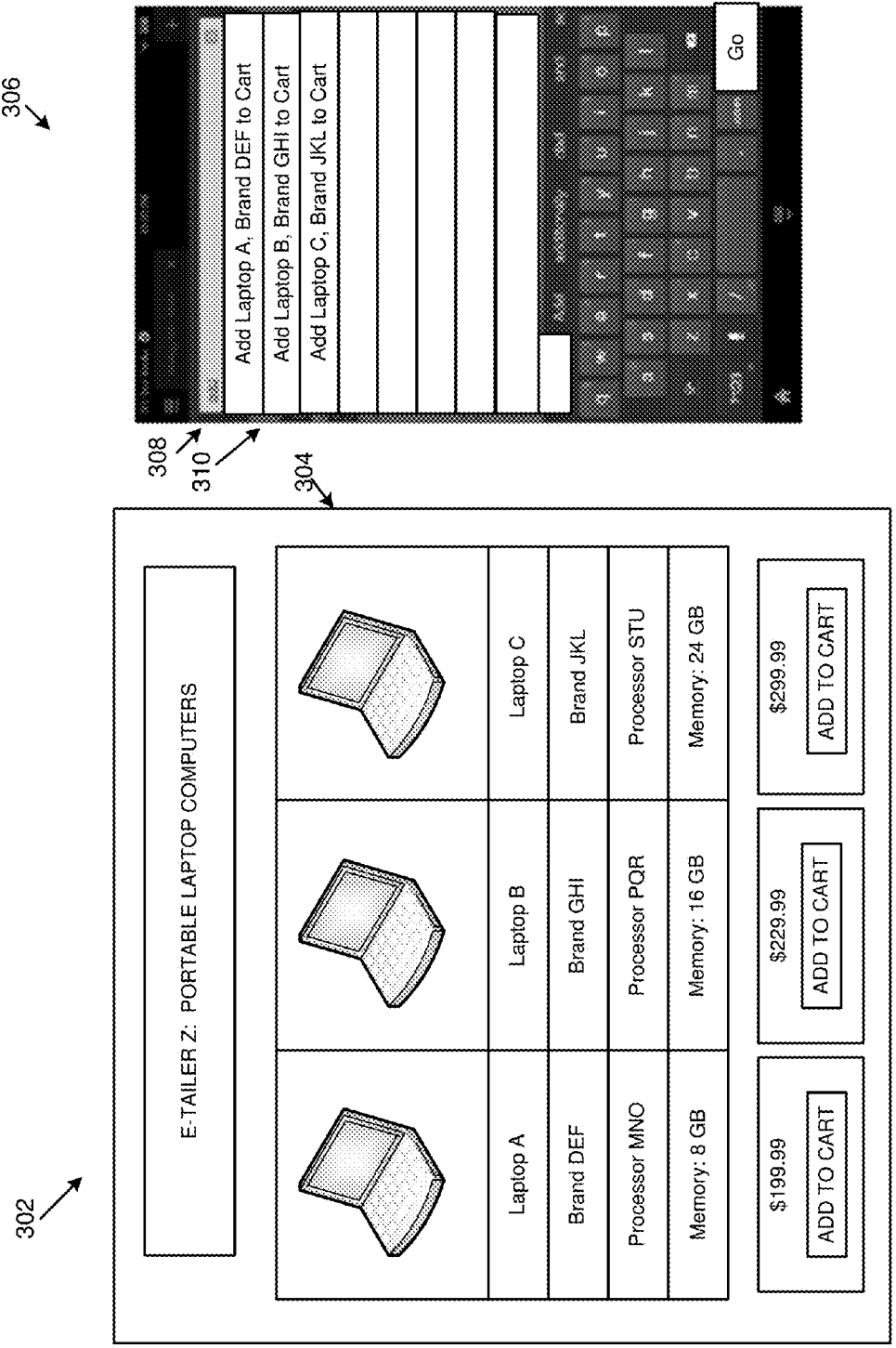
FIG. 3 illustrates example screenshots of a requested web page and a user interface used during detecting potential user actions, in accordance with an example embodiment of the disclosure.

FIG. 3 illustrates example screenshots of a requested web page and a user interface used during detecting potential user actions, in accordance with an example embodiment of the disclosure. Referring to FIG. 3, the screenshot 302 is representative of a viewport for an example requested (and loaded by device 120) web page associated with portable laptop computers being sold by an E-Tailer company "Z". At 304, several photos with hyperlinks appear for various laptops on sale. Each photo also includes an "Add to Cart" button under the item price.

Screenshot 306 illustrates an example implementation of a user interface, which may be used during a process for detecting/mining potential user actions from a web page. For example, the interactive buttons "Add to Cart" in screenshot 302 may include attribute tooltips with the text phrases 310, as seen in screenshot 306. The phrases 310 may be used and included within the corpus of phrases 148. A user of the client device (e.g., device 120, with display visible at screenshot 306) may enter a voice input "add", as seen at 308. The text string "add" visible at 308, may be the text string generated by the speech-to-text engine 150. The text string "add" is then compared to the corpus of phrases 148, and the three top matching entries from the corpus 148 are displayed at 310 as the list of potential user actions. The user may then simply select (e.g., by tapping on an entry from the list) an action to be performed by the client device 120. In the alternative, the client device 120 may automatically perform a top listed potential user action from the generated list 155.

The text string 152 of detected commands may include more than one words. For example, the user's voice input 160 may be "add Laptop C". In this case, the third entry in the list 310 may be listed on top, since only that entry includes the words "add" and "Laptop C."

Figure 4:
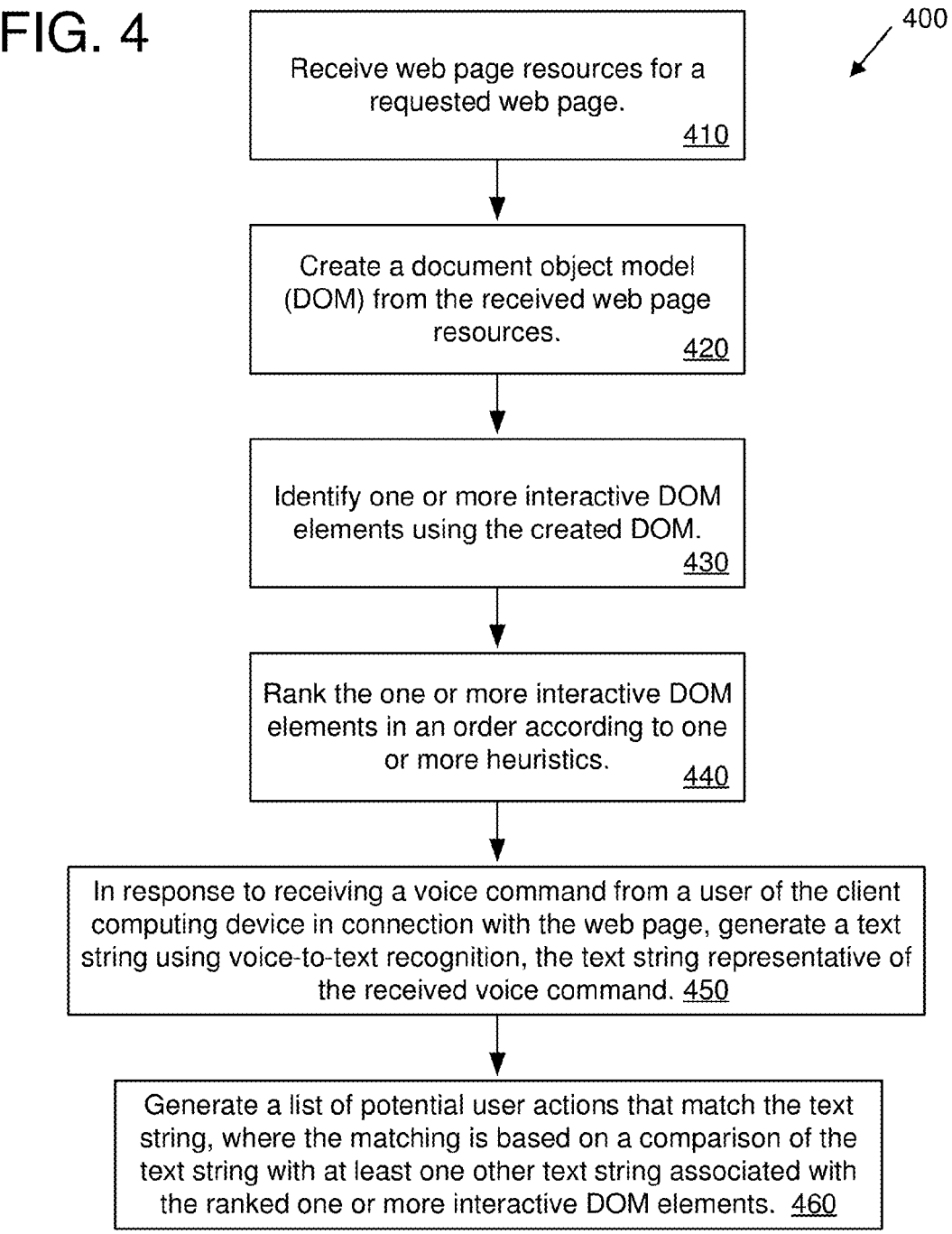
FIGS. 4, 5, and 6 are flow charts of example methods for detecting potential user actions from a web page, in accordance with an example embodiment of the disclosure.
Figure 5:
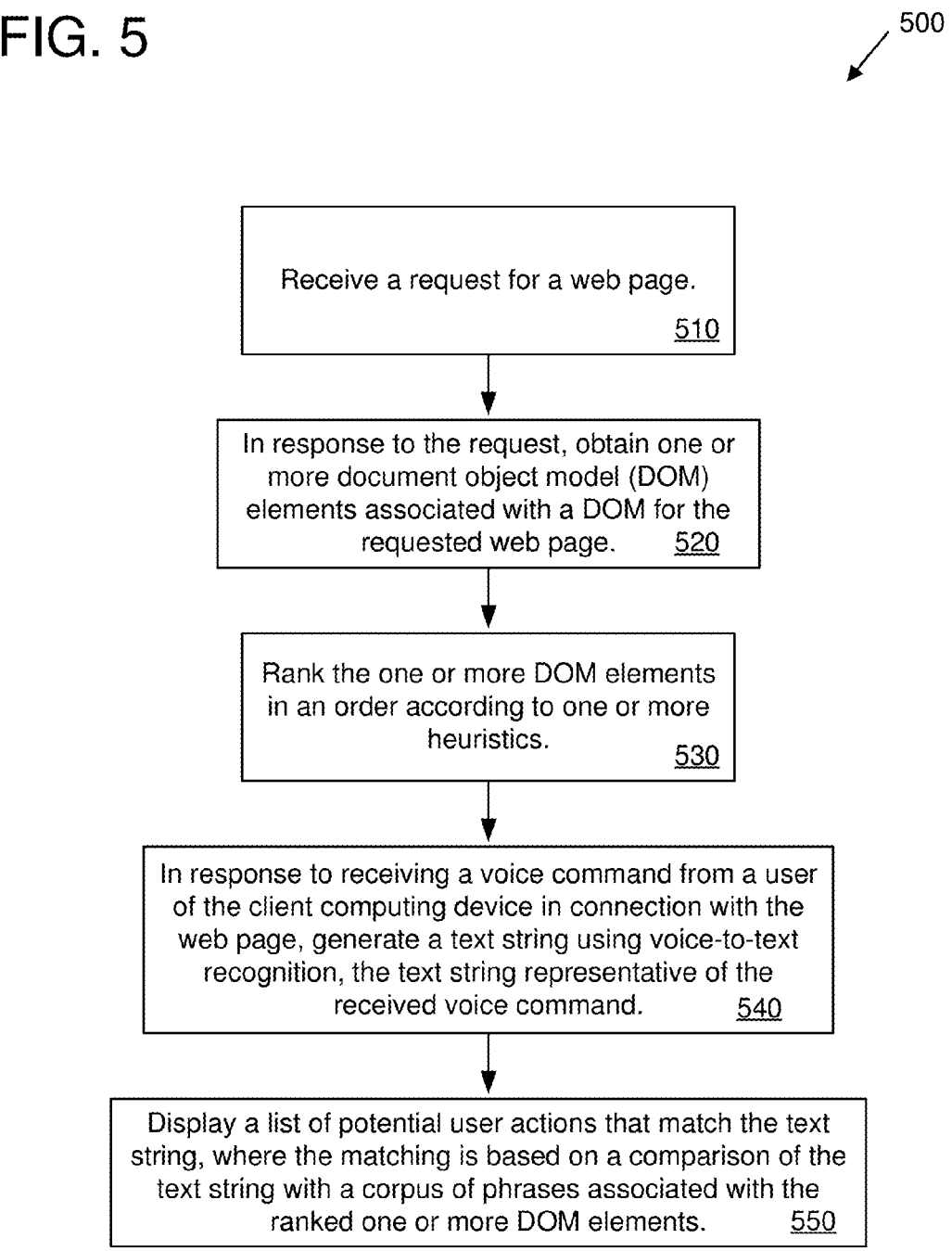
Figure 6:
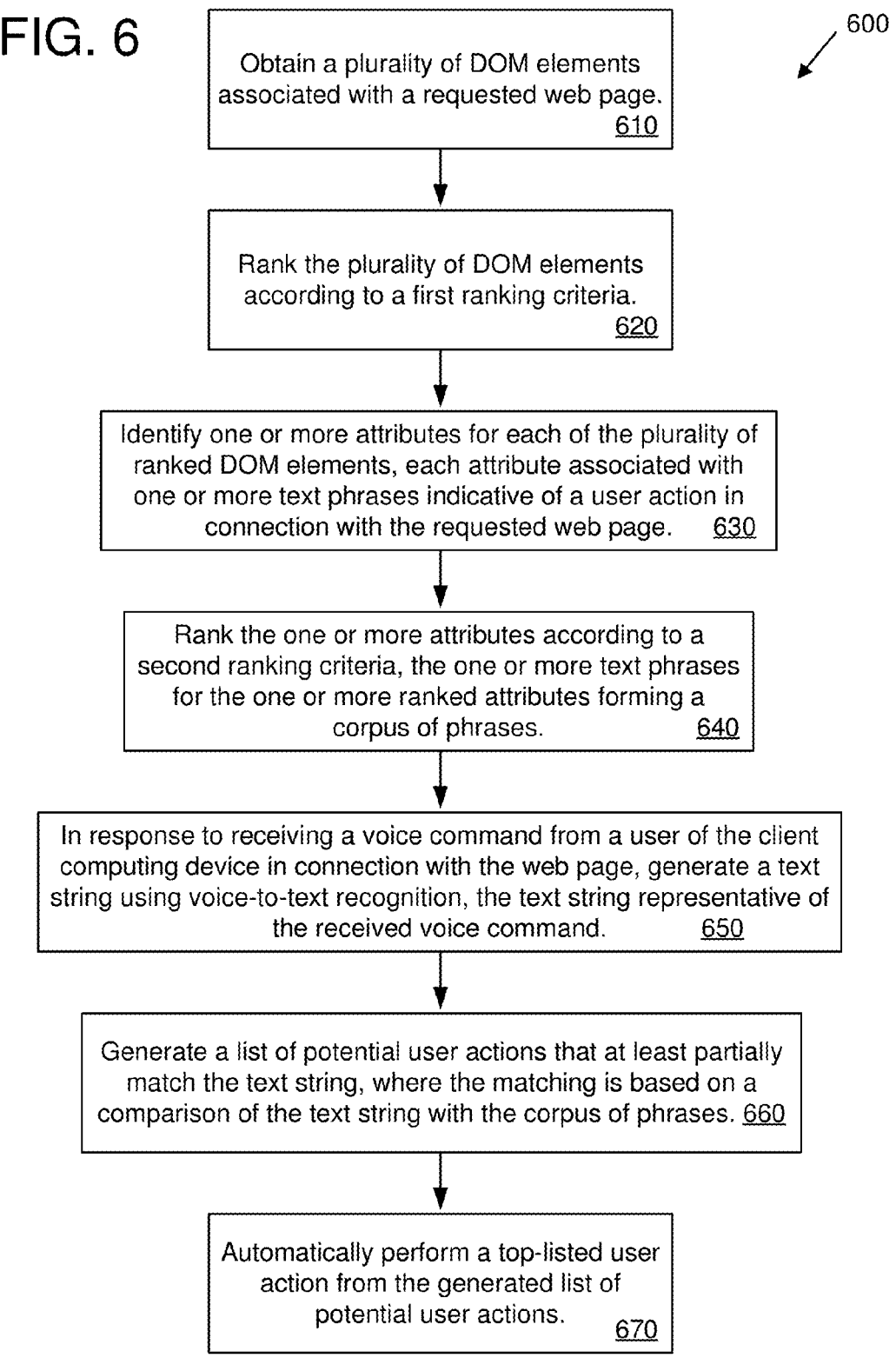

FIGS. 4, 5, and 6 are flow charts of example methods for detecting potential user actions from a web page, in accordance with an example embodiment of the disclosure. Referring to FIGS. 1 and 4, the example method 400 may start at 410, when the client device 120 may receive web page resources for a requested web page. For example, the client device 120 may receive web page data 140 for a requested web page. At 420, the detection engine 142 may create a document object model (DOM) from the received web page resources. At 430, the detection engine 142 may identify one or more interactive DOM elements (e.g., 156) using the created DOM. At 440, the ranking engine 144 may rank the one or more interactive DOM elements (156) in an order according to one or more heuristics. For example, the heuristics engine 143 may use one or more heuristics to rank the DOM elements 156. Example heuristics may include space taken by a visual representation of a DOM elements (e.g., how big is a given DOM element, such as a button, when displayed on the screen of the client device 120), currently displayed status for the DOM elements (i.e., whether a DOM element is in the current viewport for the web page and is being currently displayed), and interaction status for the DOM element (i.e., whether a DOM element is an interactive DOM element, such as an action button).

At 450, in response to receiving a voice command from a user of the client computing device in connection with the web page (e.g., voice input 160), the speech-to-text engine 150 may generate a text string (e.g., 152) using voice-to-text recognition. The text string may be representative of the received voice command via the input 160. At 460, the comparison and selection engine 154 may generate a list (e.g., 155) of potential user actions that match the text string. The matching may be based on a comparison of the text string with at least one other text string associated with the ranked one or more interactive DOM elements. For example, the comparison engine 154 may compare the text string 152 associated with the received voice input 160 with the phrases within the ranked corpus of phrases 148. The rendering/display engine 162 may display the generated list (e.g., 155) of potential user actions on a display of the client computing device 120.

Referring to FIGS. 1 and 5, the example method 500 may start at 510, when the client device 120 may receive a request for a web page (e.g., from a user of the device 120). At 520, in response to the request, the client device 120 may obtain one or more document object model (DOM) elements associated with a DOM for the requested web page. For example, the detection engine 142 may detect the DOM elements 156, attributes 158 and text strings 157. Alternatively, the DOM element detection may be performed by the headless browser environment 210, as illustrated in FIG. 2. At 530, the ranking engine 144 may rank the one or more DOM elements (e.g., 156) in an order according to one or more heuristics (e.g., as provided by the heuristics engine 143). At 540, in response to receiving a voice command from a user of the client computing device in connection with the web page (e.g., voice input 160), the speech-to-text engine 150 may generate a text string (e.g., 152) using voice-to-text recognition. The text string (152) may be representative of the received voice command. At 550, the rendering/display engine 162 may display a list of potential user actions (e.g., 155) that match the text string. The matching may be based on a comparison of the text string (e.g., 152) with a corpus of phrases (e.g., 148) associated with the ranked one or more DOM elements (e.g., 156).

Referring to FIGS. 1 and 6, the example method 600 may start at 610, when the client device 120 may obtain a plurality of DOM elements associated with a requested web page. For example, the detection engine 142 may detect the DOM elements 156, attributes 158 and text strings 157. At 620, the ranking engine 144 may rank the plurality of DOM elements (156) according to a first ranking criteria. For example, the first ranking criteria may be one or more heuristics used by the heuristics engine 143. At 630, the detection engine 142 may identify one or more attributes (e.g., 158) for each of the plurality of ranked DOM elements (156). Each attribute (158) may be associated with one or more text phrases (e.g., 157) indicative of a user action in connection with the requested web page. At 640, the ranking engine 144 may rank the one or more attributes (158) according to a second ranking criteria, the one or more text phrases for the one or more ranked attributes forming a corpus of phrases (e.g., 148). The second ranking criteria may be based on popularity (e.g., using the aggregate usage model 112 and/or the client-specific usage model 146).

At 650, in response to receiving a voice command from a user of the client computing device in connection with the web page (e.g., voice input 160), the speech-to-text engine 150 may generate a text string (e.g., 152) using voice-to-text recognition. The text string (152) may be representative of the received voice command. At 660, the comparison and selection engine 154 may generate a list (e.g., 155) of potential user actions that at least partially match the text string (152). The matching may be based on a comparison of the text string (e.g., 152) with the corpus of phrases (e.g., 148). At 670, the client device 120 may automatically perform a top-listed user action from the generated list (155) of potential user actions.

Figure 7:
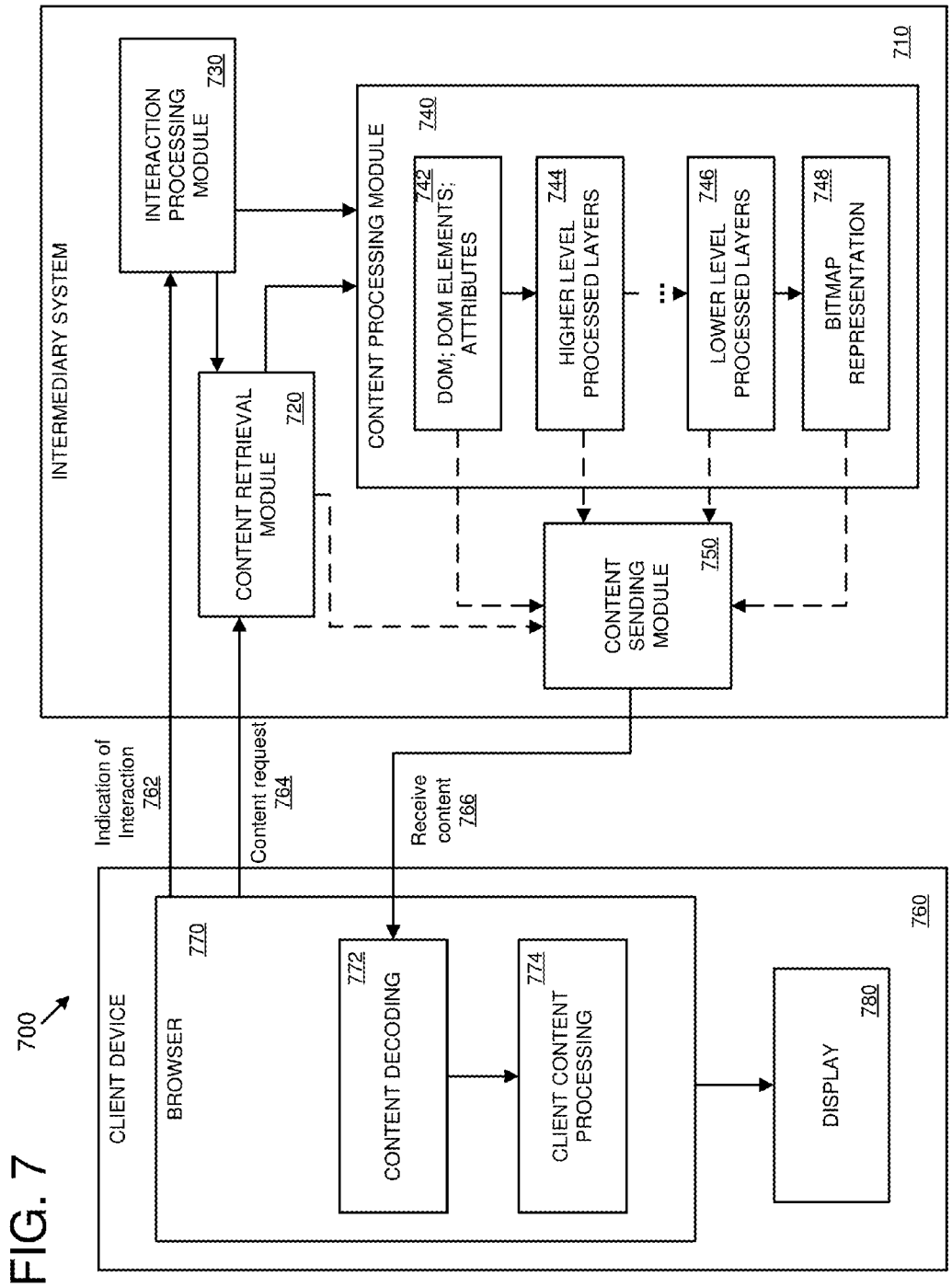
FIG. 7 is a block diagram depicting an example environment for web browsing using an intermediary system.

FIG. 7 is a block diagram depicting an example environment 700 in which content consumption activity (e.g., web browsing) is performed by a client device 760 in communication with an intermediary system 710. For example, the intermediary system 710 can be a headless browser system that performs web browsing operations independently, or in combination with, the client device 760.

The activity shown in FIG. 7 will be discussed with respect to a request for, processing of, and interaction with a content page, such as a web page. Illustratively, the content page may be any content page hosted or offered by a content source, such as a web site. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various resources including location identifiers where the resources may be obtained (e.g., local identifiers and/or external identifiers such as addresses of servers where the resources may be obtained).

As illustrated, the browser 770 of the user device 760 can send a request for content (as indicated at 764) to the content retrieval module 720 of the intermediary system 710. The request for content can be, for example, a request for a web page generated when the user selects a user-selectable option directing the browser 770 to the web page URL. The request for content may be a standardized request, such as an HTML GET request that requests a resource at a particular location. In some embodiments, the request for content may be a request for layers (e.g., for processed layers). In some embodiments, the request for content can be accompanied by data representing capabilities of client device 760, for example one or more of processing capabilities, network connection parameters, and configuration of browser 770, to name a few.

In some embodiments, when intermediary system 710 receives the request for a content page, the intermediary system 710 can assess, for the content page, whether sending the content for the page as processed layers (e.g., at one or more levels of processing) to the client device 760 will reduce a user-perceived page load time relative to at least one alternative rendering technique. In some cases, the intermediary system 710 can determine whether a layer transfer rendering technique, in which processed layers are sent, is preferable for a given page load based on a number of factors, for example the speed, bandwidth, and type of network connection of client device 760 as well as characteristics of the content site. For example, intermediary system 710 can determine or predict whether the layer transfer rendering technique will reduce a page load time and/or bandwidth consumption compared to fully rendering the content page on the browser 770 (e.g., sending original HTML and associated web resources and having the browser 770 perform all of the rendering pipeline operations) or fully rendering the content page on the intermediary system 710 (e.g., performing all of the rendering pipeline operations and sending a bitmap representation to the client device 760).

The content retrieval module 720 can retrieve the content of the content page, for example HTML and associated resources, from content sources (e.g., web servers or content servers) and/or from local storage (e.g., cache). In some implementations, the network connection between the content retrieval module 720 and the content sources may be faster than the network connection between the client device 760 and the content sources, thereby reducing latency in rendering the content page for the user. The content source may be the origin content server, a CDN server, a proxy server, or some other source.

The content processing module 740 (e.g., implementing all or part of a rendering pipeline) can receive content (e.g., web page content) from the content retrieval module 720. The content processing module 740 can construct a Document Object Model (DOM) from of the received content, as indicated at 742. For example, the DOM can be constructed by converting HTML elements and any embedded resources into DOM nodes based on a DOM definition or specification. Creating the DOM can also involve parsing any available style data, such as style data obtained from a referenced CSS file or style data included in the HTML file. The content processing module 740 can also identify and provide one or more DOM elements and/or DOM element attributes together with the DOM (as indicated at 742).

Based on the DOM, different levels of processed layers can be generated, which can include higher level processed layers 744, lower level processed layers 746 and any processed layers in-between. While two levels of processed layers are depicted (744 and 746), different implementations can have more or fewer levels of processed layers. Different layers of a content page can encompass different two-dimensional areas of the content page (for example, cover different ranges of coordinates without overlapping). In some cases, one layer may partially or completely overlap another layer (for example, a background layer may be partially overlapped by any number of other layers, each of which may partially or completely overlap other layers, etc.). The content processing module 740 can also create a bitmap representation of the content (e.g., the web page) using the processed layers, as depicted at 748. Depending on the specific configuration being used, the content processing module 740 can create information for one or more of the levels of processing (e.g., 742, 744, 746, and/or 748). For example, the content processing module 740 may process the content to create a DOM (as depicted at 742) and a higher level processed layer (as depicted at 744) without any additional processing (e.g., without proceeding to lower level processed layers or bitmaps, as depicted at 746 and 748).

The intermediary system 710 supports sending content to the client device 760 at different levels of processing. For example, the content sending module 750 can receive raw content (e.g., original HTML content and associated resources) form the content retrieval module 720. The content sending module 750 can receive DOM information from the content processing module 740. The content sending module 750 can receive different levels of processed layers from the content processing module 740. The content sending module 750 can receive bitmap images from the content processing module 740. These different sources of content are indicated by the dashed lines within the intermediary system 710. Depending on the specific configuration being used, the content sending module 750 may receive content from one or more levels of processing (e.g., the content sending module 750 may only receive lower level processed layers for sending to the client device 760).

The content sending module 750 can encode the received content for sending to the client device 760. For example, the content sending module 750 can encode layers using a variety of layer encoding techniques and can examine the content of an individual layer to determine which encoding technique to use (e.g., to minimize bandwidth or page load time, for compatibility with a particular client device, etc.).

When the client device 760 receives the content from the content sending module 750 (as indicated at 766), the browser 770 decodes the content, as indicated at 772. Decoding the content can involve performing one or more decoding techniques corresponding to the encoding techniques used to encode the content.

The browser 770 can perform client content processing, as depicted at 774. For example, the browser 770 can perform processing operations similar to, or the same as, those performed by the content processing module 740. The type of processing performed by the browser 770 can depend on the level of processing performed by the intermediary system 710. For example, if the content processing module 740 created a DOM and then a higher level processed layer (e.g., a render layer tree) and sent the higher level processed layer to the client device 760, then the browser 770 could complete the processing by creating lower level processed layers (e.g., a graphics layer tree and a composited layer tree) and bitmaps for display, as depicted at 780 (e.g., in cooperation with a GPU of the client device 760, not depicted).

In some embodiments, the browser 770 performs content processing, as depicted at 774, to create decoded layers that can be provided to a layer compositor (not depicted) for generating instructions for display to display (as depicted at 780) a visual representation of the content page based on the layers. For example, a layer tree can be constructed so that the layers will be decoded and provided to the layer compositor in an order in which the layers should be rendered. For example, the layer compositor can assemble the decoded layers in the proper positioning and in the proper order (e.g., with a background layer behind other layers, foreground layers covering background layers with overlapping coordinates, and with an interactivity layer in front of the layers).

The layer compositor can use the assembled layers to generate instructions to configure to display a visual representation of the content page.

The browser 760 can also detect user interaction with elements of the displayed content (e.g., user-selectable user-interface elements such as buttons and menus, scrolling, zooming, etc.) and send indications of user interaction to the interaction processing module 730, as indicated at 762. The browser 770 can also be configured to perform local rendering updates in some embodiments. As discussed above, a layer can be generated corresponding to a scrollable portion of the content page. Accordingly, the browser 770 can use the scrollable layer data to locally handle scrolling through the layer by updating the portion of the scrollable layer content that is displayed in the viewport, or boundary, of the scrollable layer. The browser 770 can also detect changing graphical content, for example in a GIF or video, and send a request for updated content to the intermediary system 710 if needed. In some embodiments the browser 770 may have received a URL corresponding to video content from the intermediary system 710, and accordingly may be able to handle the update to the portion of the content page including the video without sending a request to the intermediary system 710.

For any interactions that are not able to be handled locally by the browser 770 using the received content, the browser 770 can send the indications of user interaction, as depicted at 762, to the interaction processing module 730. The interaction processing module 730 can determine whether any updates to the visual representation of the content page are necessitated by the user interaction with the elements of the content. For example, the interaction processing module 730 can communicate with the content retrieval module 720 to obtain new or update content. The interaction processing module 730 can also communicate with the content processing module 740 to perform processing of content (e.g., an update to the DOM, an update to one or more processing layers, etc.) for sending back to the client device 760 in response to the interaction.

In some implementations, example environment 700 supports detection of potential user actions associated with a requested web page. For example, the intermediary system 710 and/or the client device 760 may perform the functionalities discussed in reference to FIGS. 2 and 1, respectively. More specifically, the intermediary system may implement the modules and perform the functionalities of the headless browser environment 210 (as seen in FIG. 2), and the client device 760 may perform the functionalities of client device 120, as seen in FIG. 1.

Figure 8:
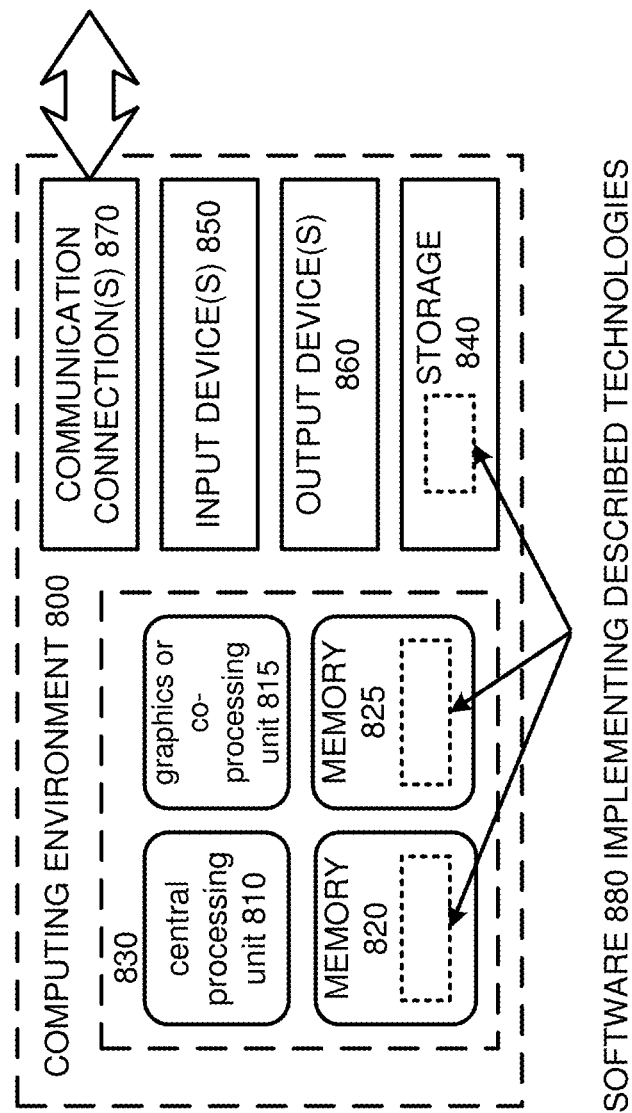
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a touch display or touchpad, a keyboard, a mouse, a pen, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method for detecting potential user actions from a web page in accordance with instructions stored on a non-transitory computer readable medium and causing a processor to perform actions comprising:
   obtaining a plurality of document object model (DOM) attributes associated with a requested web page, wherein the DOM attributes are associated with text phrases in metadata of the DOM attributes, and wherein the text phrases are indicative of user actions in connection with the requested web page;
   ranking the plurality of DOM attributes based on a combination of a heuristics assessment and a client specific model to form a Ranked Corpus of Phrases (RCOP) comprising the text phrases, wherein the heuristic assessment comprises at least one of:
   semantic meaning of a DOM element;
   structure of the DOM element;
   space taken by a visual representation of the DOM element;
   aggregate usage statistics associated with usage of the DOM element by a plurality of other users;
   currently displayed status for the DOM element; or
   interaction status for the DOM element;
   in response to receiving a voice command information from a user of a computing device in connection with the web page, transforming the voice command information into a text string using voice-to-text recognition, the text string representative of the received voice command;
   generating a list of potential user actions based on natural language processing of the text string and the RCOP;
   comparing at least a portion of the text string to one or more of the text phrases of potential user actions stored in the RCOP; and
   automatically performing a highest-ranked user action from the potential user actions.

2. The method of claim 1, wherein the ranking criteria further comprises a pre-determined ranking criteria based on popularity.

3. The method of claim 1, further comprising:
   obtaining the document object model (DOM) for the requested web page; and
   identifying the plurality of DOM attributes using the DOM.

4. The method of claim 1, wherein the DOM attributes are tooltip attributes that include the text phrases.

5. A computing device, comprising:
   one or more processing units;
   a memory coupled to the one or more processing units; and
   one or more network interfaces;

the computing device configured to perform operations for detecting potential user actions from a web page, the operations comprising:
- receiving a request for a web page;
- in response to the request, obtaining one or more document object model (DOM) attributes associated with text phrases in metadata of a DOM indicative of user actions in connection with the requested web page;
- ranking the one or more DOM attributes in an order according to one or more heuristics and a client-specific usage model to form a Ranked Corpus of Phrases (RCOP), wherein the one or more heuristics comprise at least one of:
  - semantic meaning of a DOM element;
  - structure of the DOM element;
  - space taken by a visual representation of the DOM element;
  - aggregate usage statistics associated with usage of the DOM element by a plurality of other users;
  - currently displayed status for the DOM element; or
  - interaction status for the DOM element;
- in response to receiving voice command information from the computing device in connection with the web page, transforming the voice command information into a text string using voice-to-text recognition, the text string representative of the received voice command;
- generating a list of potential user actions based on natural language processing of the text string and the RCOP; and
- displaying potential user actions that match the text string from the list of potential user actions, wherein the matching is based on a comparison of the text string with one or more RCOP attributes.

6. The computing device of claim 5, the operations further comprising:
- in response to the request, obtaining the document object model (DOM) for the requested web page; and
- identifying the one or more DOM attributes using the DOM.

7. The computing device of claim 5, the operations further comprising:
- identifying one or more attributes for each of the one or more DOM attributes.

8. The computing device of claim 7, the operations further comprising:
- determining one or more text phrases associated with each of the one or more attributes.

9. The computing device of claim 8, wherein the one or more text phrases are indicative of a user action in connection with a corresponding DOM attribute.

10. The computing device of claim 5, the operations further comprising:
- generating the RCOP based at least in part on the one or more ranked text phrases for each of the one or more attributes.

11. The computing device of claim 5, the operations further comprising:
- displaying at least a portion of the requested web page in a viewport associated with the computing device; and
- re-ranking the one or more DOM attributes upon displaying another portion of the requested web page in the viewport.

12. The computing device of claim 5, the operations further comprising:
- ranking the one or more DOM attributes based on aggregate usage statistics for a plurality of other users selecting the one or more DOM attributes.

13. The computing device of claim 5 wherein the RCOP includes attributes that are tooltip attributes that include text phrases.

14. A non-transitory computer-readable storage medium storing computer-executable instructions for detecting potential user actions from a web page, the operations comprising:
- receiving web page resources for a requested web page;
- maintaining a document object model (DOM) from the received web page resources;
- identifying one or more interactive DOM attributes associated with text phrases in the metadata of the DOM;
- ranking the one or more interactive DOM attributes in an order according to one or more heuristics and client-specific usage to generate a Ranked Corpus of Phrases (RCOP), wherein the one or more heuristics comprise at least one of:
  - semantic meaning of a DOM element;
  - structure of the DOM element;
  - space taken by a visual representation of the DOM element;
  - aggregate usage statistics associated with usage of the DOM element by a plurality of other users;
  - currently displayed status for the DOM element; or
  - interaction status for the DOM element;
- in response to receiving voice command information from a user of a client computing device in connection with the web page, transforming the voice command information into a text string using voice-to-text recognition, the text string representative of the received voice command; and
- generating a list of potential user actions that match natural language processing of the text string and the RCOP, wherein the matching is based on a comparison of the text string with at least one other text phrase associated with the RCOP.

15. The non-transitory computer-readable storage medium according to claim 14, comprising:
- displaying the generated list of potential user actions on a display of the client computing device.

16. The non-transitory computer-readable storage medium according to claim 15, comprising:
- receiving a selection of one of the listed potential user actions from the user; and
- performing the selected one of the listed potential user actions.

17. The non-transitory computer-readable storage medium according to claim 14, comprising:
- receiving the text string as user input at the client computing device.

18. The non-transitory computer-readable storage medium according to claim 14, wherein the at least one other text phrase is associated with at least one attribute for the one or more interactive DOM attributes.

19. The non-transitory computer-readable storage medium of claim 14, wherein a headless browser environment receives the web page resources, maintains the DOM, identifies the one or more interactive DOM attributes, ranks the one or more interactive DOM attributes, transforms the voice command information, and generates the list of potential user actions, and wherein the operations further comprise:

sending, by the headless browser environment, the generated list of potential user actions to the client computing device.

20. The non-transitory computer-readable storage medium of claim 14, the operations further comprising:
processing the web page resources to create one or more processed layers or bitmap images; and
sending the one or more processed layers or bitmap images to the client computing device.

* * * * *